US005835497A

United States Patent [19]
Litzenberger et al.

[11] Patent Number: 5,835,497
[45] Date of Patent: Nov. 10, 1998

[54] CALL RECORD BROADCAST VIA AN INTERFACE IN A TELECOMMUNICATIONS NETWORK

[75] Inventors: Paul D. Litzenberger, Wylie, Tex.; Louis G. Gottlieb, Colorado Springs, Colo.; Nadia A. Khalil, Plano, Tex.

[73] Assignee: MCI Communications Corporation, Washington, D.C.

[21] Appl. No.: 739,988

[22] Filed: Oct. 30, 1996

[51] Int. Cl.[6] .............................. H04J 3/12; H04M 15/00
[52] U.S. Cl. ..................... 370/522; 370/389; 370/475; 379/113; 379/121
[58] Field of Search .................. 370/392, 393, 370/395, 397, 399, 400, 402, 403, 405, 406, 411, 259, 270, 389, 522, 475, 252, 360, 384; 379/111, 112, 113, 114, 115, 116, 119, 121, 126

[56] References Cited

U.S. PATENT DOCUMENTS

| | | | |
|---|---|---|---|
| 5,218,603 | 6/1993 | Watanabe | 370/401 |
| 5,218,632 | 6/1993 | Cool | 379/126 |
| 5,325,421 | 6/1994 | Hou et al. | 379/67 |
| 5,329,527 | 7/1994 | Ujihashi et al. | 370/397 |
| 5,392,402 | 2/1995 | Robrock, II | 395/200.57 |

*Primary Examiner*—Hassan Kizou
*Assistant Examiner*—Soon-Dong Hyun

[57] ABSTRACT

A system broadcasts a call record via an interface in a telecommunications network having a plurality of network components and client platforms. A network component generates a call record following a particular call transaction over communications lines. A message including the call record is then broadcast by the network component via a high speed interface, such as a local area network. The message also includes a call record type indicator for identification of the type of the call record. After the message is received by a client platform connected to a processor, the call record type indicator is analyzed. Based on this analysis, the client platform either stores and subsequently processes the call record if required, or otherwise discards the call record.

20 Claims, 5 Drawing Sheets

CALL RECORD BROADCAST VIA AN INTERFACE IN A TELECOMMUNICATIONS NETWORK

RELATED APPLICATIONS

The present application is related to the U.S. patent application Ser. No. 08/513,593 entitled "High Speed Interface in a Telecommunications Network" and filed on Aug. 10, 1995 now U.S. Pat. No. 5,617,422, the U.S. patent application Ser. No. 08/438,913 entitled "Centralized Storage and Verification Element For Telephone Network" and filed on May 10, 1995, now U.S. Pat. No. 5,606,601 the U.S. patent application Ser. No. 08/438,931 entitled "Network Information Architecture Having Centralizing Storage and Verification Element and filed on May 10, 1995, now U.S. Pat. No. 5,737,399 and the U.S. patent application Ser. No. 08/426,256 entitled "Network Information Concentrator (NIC)" and filed on Apr. 21, 1995. The entire contents of each of these applications are expressly incorporated herein by reference.

FIELD OF THE INVENTION

This invention relates to a telecommunications network and, in particular, a high speed interface, such as a Local Area Network (LAN) for example, interconnecting various telecommunications equipment in a client/server configuration, so that call records generated on servers are quickly and efficiently transferred to client platforms for the appropriate processing.

BACKGROUND OF THE INVENTION

In order to offer many services to customers, a telecommunications network typically employs complex equipment to carry out the appropriate transactions associated with telephone calls carrying information, such as data, video or voice. Network components forming this equipment include a matrix switch for establishing the communication connection between the telephone stations and ingress and egress communication lines of the switch. The technology of completing the call from the calling station to the called station by selecting an available communication line is well known to skilled artisans. Additional telecommunications components may include computerized voice processing equipment, such as a Voice Response unit (VRU), an Audio Response Unit (ARU), or an Interactive Voice Response (IVR) for user-friendly interaction with service subscribers, and a Service Control Platform/Service Data Platform (SCP/SDP), which is a remote database and a processing unit for performing service access codes translation, calling or credit card authorization, routing address, etc.

As known in the art, these components generate call records—typically not on a real-time basis—associated with performing various call-related processing transactions. Then, the call records must be transmitted to multiple client platforms which receive and further process call records generated on the network. Examples of client platforms, also known as back-office systems, include a billing platform, a traffic statistics platform, a network management platform, a fraud management platform, and others.

Service providers must therefore transport the call records from the network components that generate them to the client platforms that process them. The transportation of records must account for the fact that each network component may generate one or more types of call records, and that each client platform may require receipt of one or more of these different types of call records.

Currently, numerous communications links connect the various network components that generate transaction records with the various client platforms that process them. For each individual client platform requesting a certain call record from a switch, for example, the switch must make a copy of the call record and transmit it to the client platform. This requires duplicate copies of the call record and duplicate transmissions of the call record for the multiple client platforms. In addition, the switch needs to maintain the network address of each client platform, and transmit the records in different protocol formats to accommodate disparate interfaces. With increases in call volumes and intelligent services provided to subscribers, the corresponding increase in capacity of these communications links becomes too costly for service providers.

A significant accomplishment in overcoming the above disadvantages has been provided by a Network Information Concentrator (NIC) which is a cluster of processors, as described in the co-pending U.S. patent application Ser. No. 08/426,256 entitled "Network Information Concentrator (NIC)", which is incorporated herein by reference.

A data flow of this exemplary system is illustrated in FIG. 1. Various examples of network components include Switch 102, ARU 104, SCP 106, and Intelligent Services Network (ISN) 108. ISN 108 may, in turn, include multiple components, such as an Automatic Call Distributor (ACD), an Operator Console, and a ISN-based ARU.

Each of these network components generate various types of call records and transmit them to NIC 110. Transmission may be over dedicated data links using conventional communications protocol, such as X.25. Alternatively, transmission may be over a LAN, such as a Fiber Distributed Data Interface (FDDI) which uses token ring or ethernet topology. NIC 110 is linked to each client platform in a similar fashion.

In operation, NIC 110 receives a single copy of a call record from each network component, duplicates the record and distributes copies among the various client platforms that require it. The exemplary client platforms may include Fraud Management (FM) 112, Global and Local Support Elements (GSE, LSE) 114 and 122, respectively, Billing 116, Traffic 118, Network Management (NM) 120, and Operations, Administration, Maintenance, and Provisioning (OAM&P) 124. NIC 110 also performs standardization of data formats for record distribution to these platforms. Copies of call records are transmitted upon request to the client platforms.

The above system and method, however, still require high capacity bandwidth between the NIC and the client platforms, since multiple copies of each call record are transmitted. If the NIC, client platforms, and network components are nodes on the LAN, then the network capacity must also accommodate transmission of the original call records from the components to the NIC.

Thus, despite overcoming disadvantages of the current systems, the following limitations still remain:
duplicate copies of each call record must be created;
duplicate copies of each call record must be transmitted;
individual addresses for each client platform must be maintained.

SUMMARY OF THE INVENTION

These and other limitations are overcome with an inventive system which broadcasts a call record via an interface in a telecommunications network including a plurality of network components and client platforms. The system includes a network component for providing a call processing operation associated with information transferred over communications lines. The network component generates a call record corresponding to the call processing operation. Further provided is a client platform which processes the call record in accordance with an application being executed by processing means located therein. A Local Area Network (LAN) provides a communications interface between the network component transmitting a message which includes the call record, and the client platform receiving the message. The message further includes a call record type indicator specifying a type of the call record. The processing means connected to the client platform fetches the call record type indicator to ascertain whether the call record should be stored and processed in the client platform.

In accordance with one aspect of the present invention, the client platform sends a request via the LAN for a rebroadcast of the call record if missing or corrupted information is found therein.

In accordance with another aspect of the present invention, a processing platform, communicatively coupled with the network element, stores the call record as transmitted by the network component. In response to the request from the client platform if missing or corrupted information is found in the call record, the processing platform rebroadcasts the call record via the LAN.

Another embodiment of the present invention includes a pair of network components for providing a call processing operation associated with information transferred over communications lines. At least one network component of the pair generates a call record corresponding to the call processing operation, and the network components communicate with each other via a first local area network. Further provided is at least a pair of client platforms for processing the call record in accordance with an application being executed by processing means located thereon. The client platforms communicate with each other via a second local area network. A wide area network (WAN) provides a communications interface between the network component transmitting a message which includes the call record, and the client platform receiving the message. The message further includes a call record type indicator specifying a type of the call record. A processing means connected to the client platform fetches or otherwise reads the call record type indicator to ascertain whether the call record should be stored and processed in the client platform.

In a typical telecommunications network, such as provided by MCI Communications Corporation for example, numerous types of call records are created by network components. There are also numerous client platforms, each of which requires receipt of one or more types of call records. Thus, there is a significant traffic generated by transmission of the various call records to numerous client platforms. Among other things, the present invention greatly reduces this traffic.

Another advantage provided by the present invention is realized during the addition of new client platforms. Thus, according to one aspect of the present invention, each network component need not be programmed to incorporate a new record duplication process, a new client platform address, and a new transmission.

BRIEF DESCRIPTION OF THE DRAWINGS

The above-mentioned as well as additional advantages and features of the present invention will be evident and more clearly understood when considered in conjunction with the accompanying drawings, in which.

In all Figures, like reference numerals represent same or identical components of the present invention.

DESCRIPTION OF THE PREFERRED EMBODIMENTS

Figure 2:
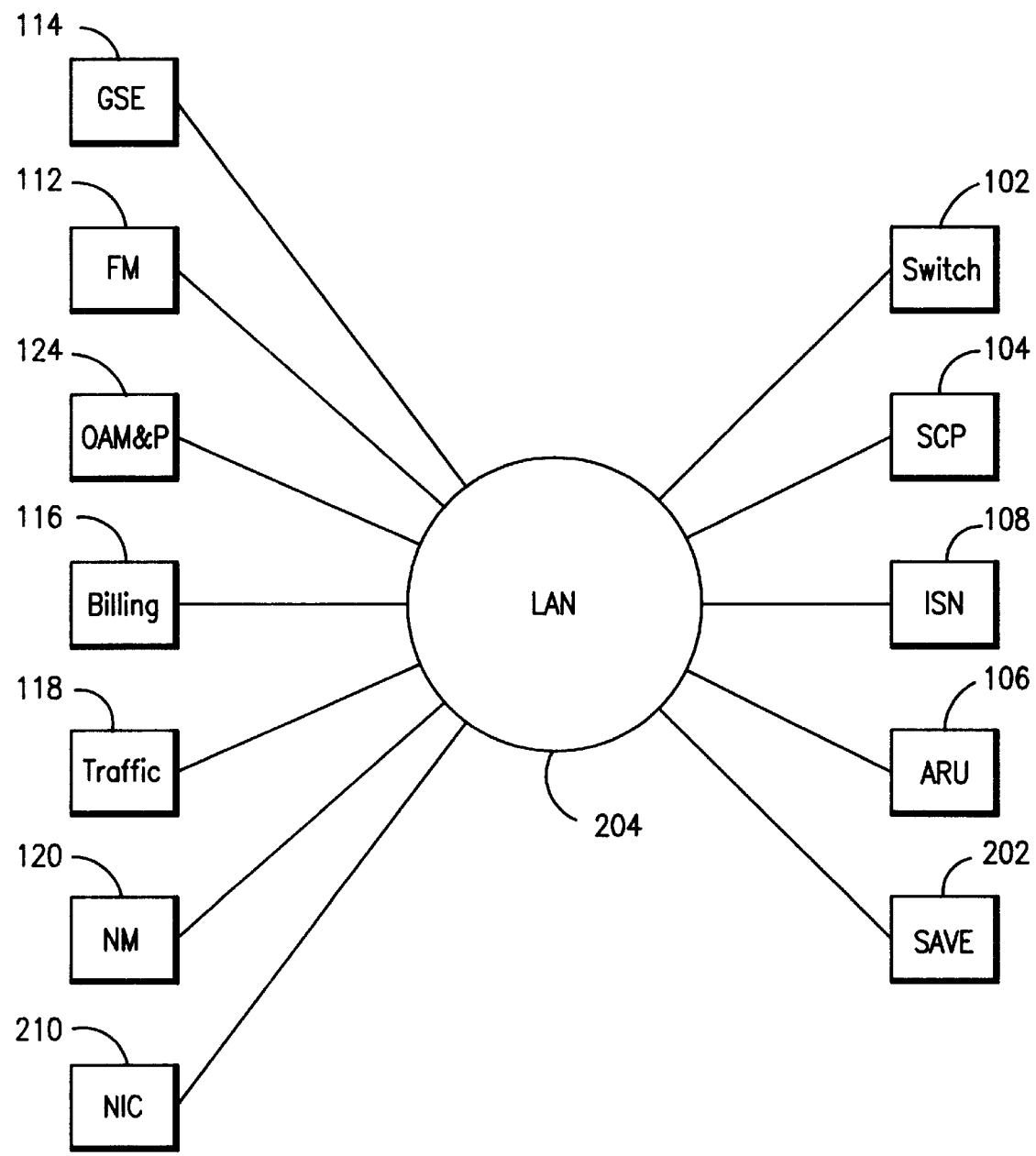
FIG. 2 shows a block diagram of call record broadcasting via a high speed interface in accordance with one embodiment of the present invention.

To facilitate its understanding, a general overview of the present invention is shown in block diagram form in FIG. 2. As previously stated, the network components generate call records, typically off-line, i.e., not in real-time. The call records are then transmitted from the network components to the client platforms. According to the inventive system, less bandwidth is required for the call record transmission, as well as less processing by the network components. In addition, the overall transmission is simplified.

This is accomplished by broadcasting a single copy of each record via an interface, such as a LAN for example, in accordance with one embodiment of the present invention. Those client platforms requiring a call record receive the broadcast of the record over the LAN.

Thus, each network component and client platform are interfaced via the LAN, i.e., appear as nodes on the LAN. As an interface, the LAN may include a Fiber Distributed Data Interface (FDDI) which uses token ring or ethernet topology, as well as Asynchronous Transfer Mode (ATM). The LAN technology, as well as various network topologies, are well known in the art and will not be described in detail for the sake of maintaining focus on the inventive system.

In operation, each network component creates a call record during or upon the completion of call servicing. First, the call record is validated and stored by the network component. The network component then transmits one copy of the call record as a single broadcast over the LAN, for example. The record is transmitted in a form of a message. In the address field of the message, a call record type indicator is specified. The call record type indicator is used by each client platform to determine if the record needs to be processed.

Each client platform receives the broadcast of the call record and reads the call type indicator. If the call type indicator is one in which the client platform is interested in, i.e., requires processing, then the client platform stores the record and proceeds with its processing. If, however, the client platform is not interested in the call record, it is ignored and the client platform listens for the next message.

One embodiment of the present invention will now described in detail with reference to FIGS. 2, 3a, 3b and 3c. Each network component (i.e., Switch 102, SCP 104, ISN 108 and ARU 106) and client platform (i.e., GSE 114, FM 112, OAM&P 124, Billing 116, Traffic 118, NM 120 and NIC 110) are interconnected via a LAN 204. The LAN 204 may be a token ring, fast ethernet, or ATM, and implemented using a Fiber Distributed Data Interface (FDDI) ring, as well known in the art.

In the preferred embodiment of the present invention, each network component, such as the Switch 102, broadcasts over the LAN 204 a single copy of the call record. The call record is transmitted as a message in which the address field is populated with a call record type indicator. The call record type indicator specifies the type of the call record, and is used by the client platform to determine if the call record should be processed.

For example, the Switch 102 creates a Call Detail Record (CDR). As merely an example, the CDR is used by the Fraud Management (FM) platform 112 for fraud detection, but is not used by the Billing platform 116. The Switch 102 includes the CDR in a message in which the address field has a certain code. The code indicates that this message includes, among other things, a CDR. The Switch 102 then broadcasts this message over the LAN 204.

The FM 112, along with every other client platform, receives the message broadcast and reads the address field. Based on the code in the address field, the FM 112 determines whether the message includes a CDR intended for processing by the FM 112. If so, the FM 112 stores the CDR and proceeds to process it.

Substantially concurrently with receipt by the FM 112, the Billing platform 116 also receives the same message and determines what type of record it includes. This determination is based on the address field, as previously stated. Since the message contains the CDR and the Billing platform 116 does not need to process it, it will not store the CDR.

Figure 1:
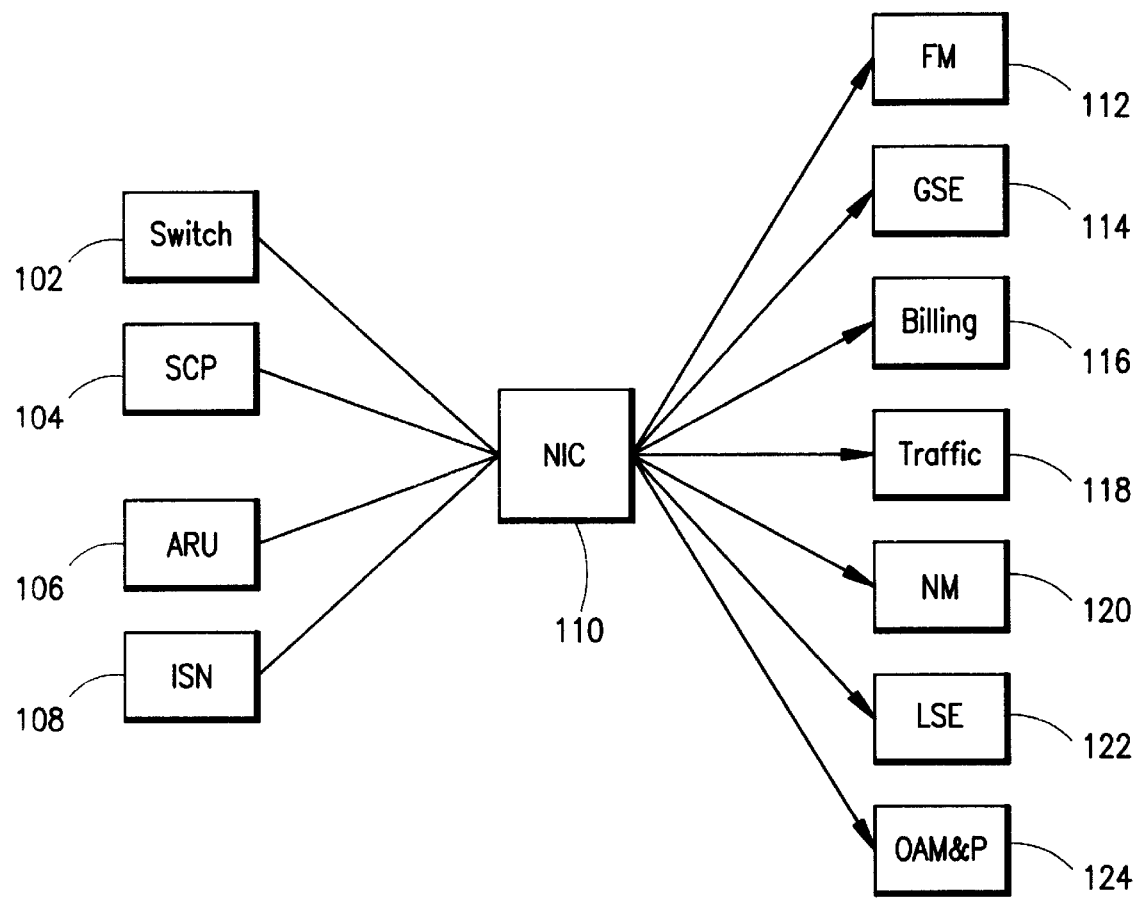
FIG. 1 shows a block diagram of a telecommunications system using the NIC for transferring call records between the systems that generate them and systems that receive those records for processing.

It should also be noted that the present invention includes a NIC 210, instead of the NIC 110 of FIG. 1. As explained above with reference to FIG. 1, each network component, such as the switch for example, transmits one copy of a call record to the NIC 110. The NIC 110 then duplicates the call record and transmits a copy to each client platform (i.e., Billing) that needs it. This consumes excessive bandwidth on the LAN and requires additional processing, namely the duplication of call records by the NIC 110. It also requires that the NIC maintains LAN addresses for each client platform.

In the embodiment of the present invention as shown in FIG. 2, the NIC 210 is employed, but its functionality has been changed significantly. While the NIC 210 still serves other call record processing functions, its previous function of duplicating and distributing call records has been eliminated completely. It may therefore be used as a client platform according to on e embodiment of the present invention. That is, call records are broadcast via the interface by a network component, and those call records intended for the NIC are processed in accordance with the disclosure of the co-pending U.S. patent application Ser. No. 08/426,256.

Also included in one embodiment of the present invention is a Storage and Verification Element (SAVE) 202, as illustrated in FIG. 2. Each network component that generates and transmits call records has access to the SAVE.

The SAVE 202 is used to assure data integrity early in the call record process. It collects call records from multiple network components of a similar nature (i.e. multiple switches or multiple SCPs) and formats them by disassembling and reassembling data packets. The SAVE also identifies call records by sequence and performs checks for duplicates and gaps in them. It may then transmit the call records to the NIC 210. The SAVE also saves all call records for future reference: if a downstream client platform or the NIC requests a certain call record that was not received or was corrupted, the SAVE retrieves the appropriate call record from its storage and retransmits it.

The SAVE may be implemented within each network component by enhancing the functionality of the network component. Conventional switches used in a telecommunications network generally have sufficient capacity to perform the SAVE functions. It may be preferable, however, to offload these extra processing operations from the switches by implementing the SAVE functions in an adjunct processor. Thus, the SAVE 202 may be implemented, alternatively, as a separate component, such as an adjunct processor, connected to its corresponding network component. A preferred design and use of a SAVE is fully disclosed in the co-pending U.S. patent application Ser. No. 08/438,913 entitled "Centralizing Storage And Verification Element For Telephone Network", which is incorporated herein by reference.

While in the preferred embodiment of the present invention each network component uses a separate SAVE, a single SAVE may be shared by the network components as shown in FIG. 2 without departing from the spirit and scope of the present invention.

Figure 3A:
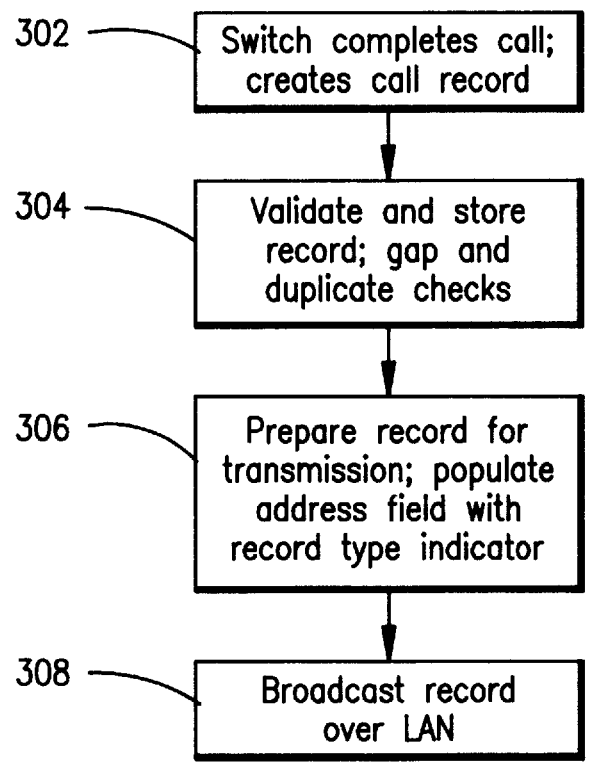
FIG. 3a shows a sequencing flow chart for the high-level processing performed by an exemplary network component, i.e., switch, in accordance with one aspect of the present invention.
Figure 3B:
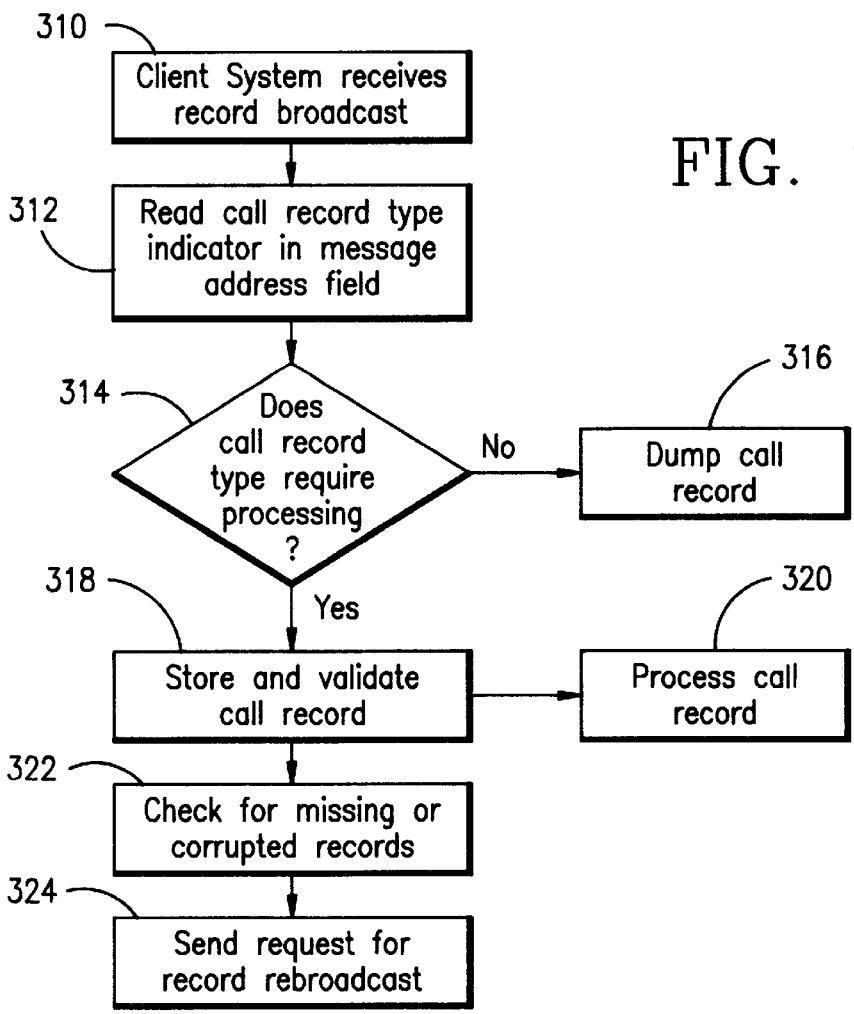
FIGS. 3b shows a sequencing flow chart for the high-level processing performed by an exemplary client platform in accordance with another aspect of the present invention.
Figure 3C:
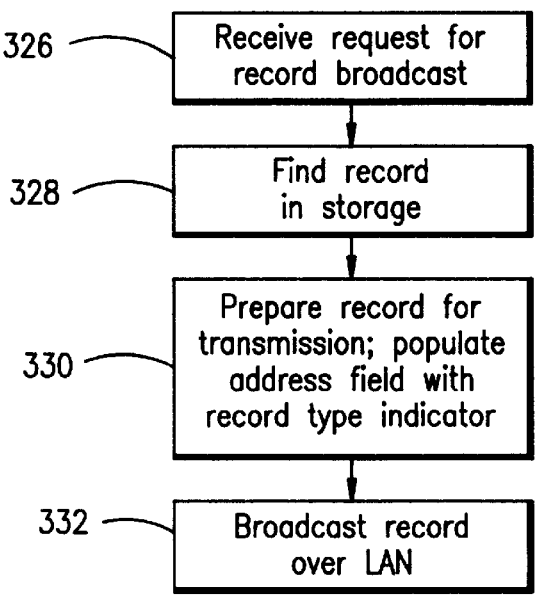
FIGS. 3c shows a sequencing flow chart for the high-level processing performed by an exemplary network component, i.e., switch, in responding to a record rebroadcast request according to yet another aspect of the present invention.

FIGS. 3a–3c illustrate the sequencing flow charts showing the high-level processing performed by a network component and a client platform according to one embodiment of the present invention. In particular, FIG. 3a shows a sequencing flow chart for the processing performed by a switch.

In step 302, the switch completes the processing of a telephone call and creates a call record. In step 304, the switch performs the SAVE functions including validation of the call record, its storage in a predetermined memory area, and checks for gaps and duplicates in the call records. A gap check includes checks for gaps in both sequence number and time span.

In step 306, the switch prepares the completed call record for transmission to the client platforms by creating a message that includes the call record. The switch populates the address field of this message with a call record type indicator. In step 308, the switch broadcasts the record once over the LAN, for example. The broadcast is received by each client platform located on the LAN.

FIG. 3b shows a sequencing flow chart for the processing performed by a client platform. In step 310, the client platform receives the call record broadcast. In step 312, a processor connected to the client platform fetches or otherwise reads the call record type indicator to determine the type of the call record, as indicated in the address field of the message. A determination is then made in step 314 whether this type of the call record is needed by the client platform for processing. For example, if the client platform is the Billing and the call record type is a Billing Detail Record generated from the ISN, then this client platform is required to process it. Similarly, if the type of the call record is a Call Detail Record generated by a switch for an unbillable call for example, then the Billing platform does not have to process it.

If the response in step 314 is negative, then the client platform merely dumps the record by not storing it (step 316). On the other hand, if the response in step 314 is positive, then the processing proceeds to step 318.

In step 318, the client platform stores and validates the record. Validation may be on data format, data completion, sequence number, time span, or any other parameters, as needed by the application. In step 320, the client platform processes the call record accordingly.

In addition to processing the call record, the client platform may also perform routine checks for missing or corrupted records (step 322). These checks are performed on call records previously stored by the client platform, and may optionally be part of the validation in step 318, depending on the application. If a missing or corrupted record is identified, then the client platform sends a request for a rebroadcast of that record. In step 324, the client platform sends a request message that identifies the record for rebroadcast and the network component that generated it. The network component is identified in the address field of the message. As an alternative to the identification of the network component, a distinct SAVE component may be identified, if that SAVE component is responsible for storage and verification functions for the network component that originally generated the requested call record.

FIG. 3c shows the sequencing flow chart for the processing performed by the network component (i.e., switch) in responding to a record rebroadcast request. In step 326, the switch receives a request for the record rebroadcast. The switch then ascertains the address field, in which the switch is identified as the network component for which the request is intended. It then proceeds to process the request. In step 328, the switch searches for the requested call record in its storage. This search is performed by using a call record identifier as an index, and is conventional in modern switch technology. In step 330, the switch prepares the record for the rebroadcast in the same manner as in step 306 of FIG. 3a. That is, a message including the call record is created, and the address field of this message is populated with a call record type indicator. In step 332, the switch broadcasts the record over the LAN, similar to the processing in step 308 of FIG. 3a.

As an alternative embodiment, in step 330 the switch may indicate in the address field a specific LAN address for the client platform which requested the call record rebroadcast. Then, in step 332, the switch transmits the call record directly to the particular client platform.

Figure 4:
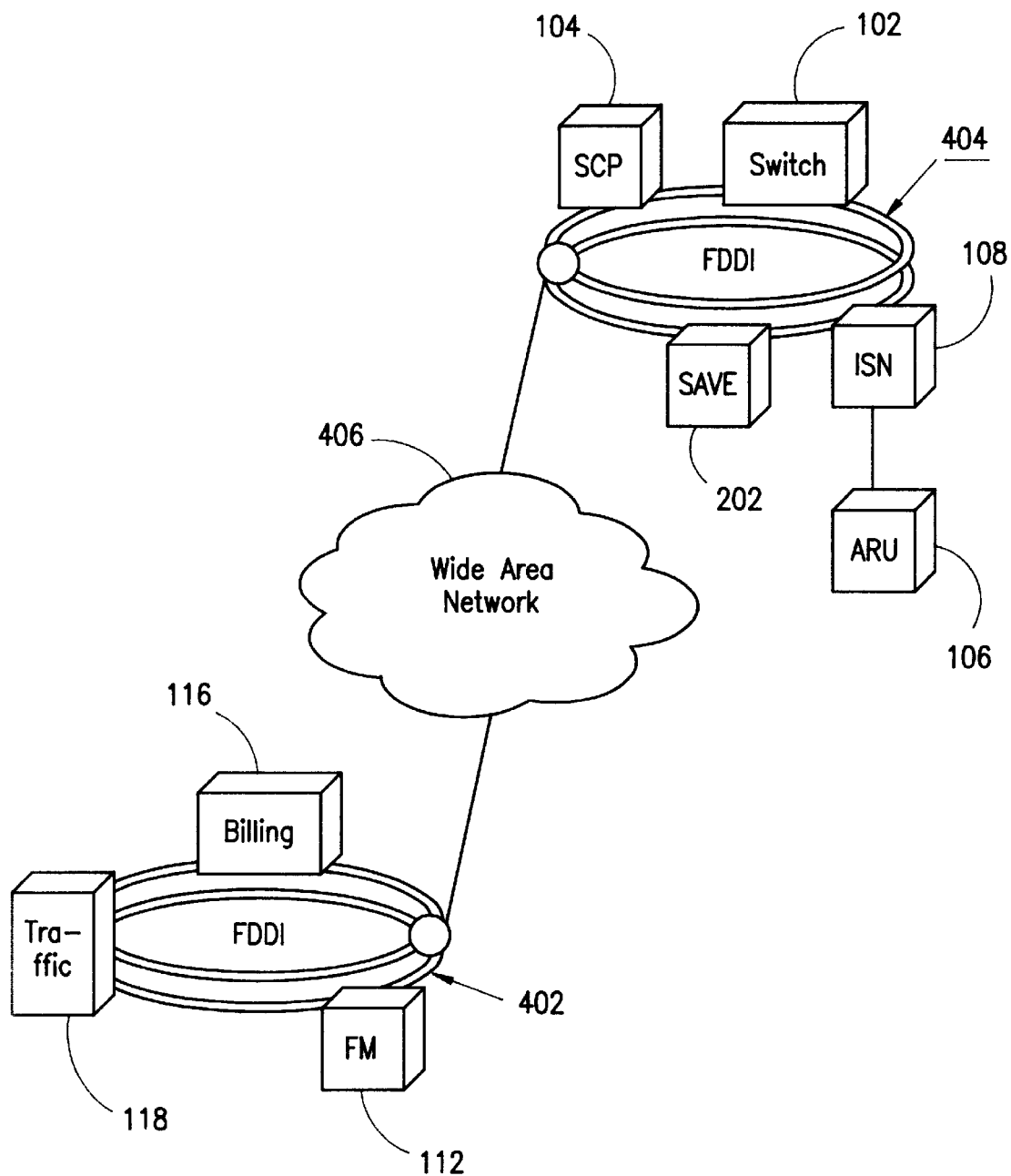
FIG. 4 shows a block diagram of call record broadcasting via a high speed interface using the configuration of two Local Area Networks joined by a Wide Area Network as a backbone, in accordance with another embodiment of the present invention.

Another embodiment of the present invention is shown in FIG. 4. A Local Area Network (LAN) 404 connects various network components using the FDDI standard. Representatively located on the LAN 404 is the Switch 102, SCP 104, SAVE 202 and ISN 108, which is communicatively coupled with ARU 106 via the X.25 data link, for example. The functional description of each of these network components has been previously explained in this disclosure.

Further in accordance with FIG. 4, a second LAN 402 representatively connects Fraud Management (FM) platform 112, Billing platform 116 and Traffic platform 118. As merely an example, the second LAN 402 uses the FDDI standard similar to the LAN 404.

The first LAN 404 and the second LAN 402 are joined by a Wide Area Network (WAN) 406, which may be implemented with modern techniques such as the Fast Ethernet or the Asynchronous Transfer Mode (ATM), and forms the backbone network. That is, the network components on the LAN 404 and the client platforms on the LAN 402 communicate via the WAN 406, which can also support additional Local Area Networks if needed. This arrangement allows the high speed transfer of call records generated on any network component of the LAN 404 to any client platform on the LAN 402. Furthermore, call record broadcast via the high speed interface is also afforded to ARU 106, which is indirectly attached to the LAN 404 via the link to ISN 108.

Such a high speed interface is fully described in the co-pending U.S. patent application Ser. No. 08/513,593 entitled "High Speed Interface in a Telecommunications Network", which is incorporated herein by reference. The high speed interface provides a common, high-bandwidth link among the network components and client platforms.

It is apparent from the above description that a single broadcast of a call record is transmitted via a high speed interface, in contrast to the transmission of multiple copies of a record to individual client platforms. The present invention also populates an address field in a message with a call record type indicator.

It is also apparent from the above description that the present invention provides, among other things, the following advantages to a service provider:

capacity of the interface is increased by minimizing bandwidth needed for call record transmissions;

processing requirements of network components, including a NIC, are reduced by having them produce a single copy of each call record for transmission;

the need is eliminated for network components, such as the NIC, to maintain individual network addresses for each client platform;

the time and effort required to add new client platforms are reduced because each network component need not be programmed to incorporate a new record duplication process and an address of the new client platform, as well as comply with a new transmission protocol of the new client platform.

It is understood, of course, that most records created by network components are for billable services. It is therefore apparent that the call records may include billing records, in addition to other information.

Since those skilled in the art can modify the disclosed specific embodiments without departing from the spirit of the invention, it is intended that the claims set forth below be interpreted to cover such modifications and equivalents.

What is claimed is:

1. A system for broadcasting a call record in a telecommunications network, said system comprising:

a first network component for providing a first call processing operation and for generating a first message comprising a first call record corresponding to said first call processing operation;

a second network component for providing a second call processing operation and for generating a second message comprising a second call record corresponding to said second call processing operation;

a first platform for processing said first call record in accordance with an application being executed by a processor connected to said first platform;

a second platform for processing said second call record in accordance with an application being executed by a processor connected to said second platform, a network for providing a communications interface between said network components and said platforms for transmitting both of said call record messages to each of said platforms;

a first addressing element for including in said first call record message a call record type indicator specifying a type of said first call record;

a second addressing element for including in said second call record message a call record type indicator specifying a type of said second call record different from the type of said first call record;

each of said platforms being adapted to discriminate between said first and second call record type indicators and to store only the call record to be processed therein.

2. The system according to claim 1, wherein at least one of said call records comprises a billing record generated in response to a service provided to a subscriber.

3. The system according to claim 1 further comprising a check element communicatively coupled with said network components for storing said call records and performing a check on said call records for at least one of duplicate records, missing information, and corrupted information.

4. The system according to claim 1, wherein said first network component includes said first addressing element, wherein said first addressing element populates an address field of said first message with said first call record type indicator for identification by said first platform, wherein said second network component includes said second addressing element, and wherein said second addressing element populates an address field of said second message with said second call record type indicator for identification by said second platform.

5. The system according to claim 1, wherein each of said platforms comprises a checking element for performing a check for missing or corrupted information in the call record stored therein upon receipt of said stored call record via said network.

6. The system according to claim 5, wherein each of said platforms further comprises a request element for sending a request via said network for a rebroadcast of the call record stored therein if said check shows missing or corrupted information.

7. The system according to claim 6 further comprising a storage element communicatively coupled with said network components for storing said call records and for responding to said request by causing the requested record to be rebroadcast via said network.

8. The system according to claim 1, wherein said network comprises a local area network (LAN).

9. The system according to claim 1, wherein said network components are on a first local area network (LAN) and said platforms are on a second LAN, and wherein a wide area network (WAN) provides a communications interface between said first LAN and said second LAN.

10. A system for broadcasting a call record in a telecommunications network, said system comprising:

a pair of network components for providing a plurality of different call processing operations, each network component of said pair being adapted to provide a message comprising a call record corresponding to end of said different call processing operations;

a pair of platforms each adapted to process a corresponding one of said call records in accordance with an application being executed by a process or connected to the platform;

a network for providing a communications interface between said network components and said platforms for transmitting both of said call record messages to each of said platforms; and at least one addressing element for including in each of said call record messages a call record type indicator specifying a type of said call record, each of said call record type indicators being different from the other to specifically identify said corresponding call processing operation, and each of said platforms being adapted to discriminate between said call record type indicators and to store only the call record to be processed therein.

11. The system according to claim 10, wherein at least one of said call records comprises a billing record generated in response to a service provided to a subscriber.

12. The system according to claim 10 further comprising a checking element communicatively coupled with said network components for storing said call records and performing a check on said call records for at least one of duplicate records, missing information, and corrupted information.

13. The system according to claim 10, wherein said network components are on a first local area network (LAN) and said platforms are on a second LAN, wherein a wide area network (WAN) provides a communications interface between said first LAN and said second LAN, wherein each of said network components includes a corresponding addressing element, and wherein each addressing element populates an address field of the corresponding message with the corresponding call record type indicator for identification by the corresponding processing platform.

14. The system according to claim 13, wherein each of said processing platforms comprises a checking element for performing a check for missing or corrupted information in said corresponding call record upon receipt of said corresponding call record via said WAN.

15. The system according to claim 14, wherein each of said platforms further comprises a request element for sending a request via said WAN for a rebroadcast of said corresponding call record if said check shows missing or corrupted information.

16. The system according to claim 15 further comprising a storage element communicatively coupled with said network components for storing said call records and for responding to said request by causing the requested record to be rebroadcast via said WAN.

17. The system according to claim 10, further comprising another network component connected to the one or the other network component of said pair of network components independently of said network, and wherein said another network component generates said corresponding call record and transmits it to said corresponding platform via the network component to which said another network component is connected.

18. A method of broadcasting a call record in a telecommunications network including a plurality of network components and a plurality of platforms, said method comprising:

generating a first message at a first network of said component plurality for providing a first call processing operation, said first message comprising a first call record corresponding to said first call processing operation;

processing said first call record at a first platform of said platform plurality in accordance with an application being executed by a processor connected to said first platform;

including in said first message by an addressing element a first call record type indicator specifying a type of said first call record;

generating a second message at a second network component of said component plurality for providing a second call processing operation, said second message comprising a second call record corresponding to said second call processing operation;

processing said second call record at a second processing platform of said platform plurality in accordance with an application being executed by a processor connected to said second processing platform;

including in said second call record message by an addressing element a second call record type indicator specifying a type of said second call record different from the type of said first call record;

transmitting both of said call record messages to each of said platforms via a network for providing a communications interface between said network components and said platforms;

and discriminating at each of said processing platforms between said first and second call record type indicators, and storing at said first and second processing platforms only the call record to be processed therein.

19. The method according to claim 18 further comprising performing a check on each stored record for at least one of duplicate records, missing information, and corrupted information, and sending a request via said network for a rebroadcast of the stored call record if said check shows missing or corrupted information.

20. The method according to claim 18 wherein an address field of each of said messages is populated with the corresponding call record type indicator for identification by the corresponding platform of the call record to be processed therein.

* * * * *